US011730147B2

(12) United States Patent
Van De Loo

(10) Patent No.: US 11,730,147 B2
(45) Date of Patent: Aug. 22, 2023

(54) INCUBATION PROCESS OF EGGS IN HATCHERIES

(71) Applicant: COLUMBUS BESLOTEN VENNOOTSCHAP, Asperen (NL)

(72) Inventor: Philip Karel Marie-Louise Van De Loo, Vianen (NL)

(73) Assignee: COLUMBUS BESLOTEN VENNOOTSCHAP, Asperen (NL)

( * ) Notice: Subject to any disclaimer, the term of this patent is extended or adjusted under 35 U.S.C. 154(b) by 169 days.

(21) Appl. No.: 16/764,694

(22) PCT Filed: Nov. 15, 2018

(86) PCT No.: PCT/IB2018/058990
§ 371 (c)(1),
(2) Date: May 15, 2020

(87) PCT Pub. No.: WO2019/097439
PCT Pub. Date: May 23, 2019

(65) Prior Publication Data
US 2021/0169050 A1 Jun. 10, 2021

(30) Foreign Application Priority Data
Nov. 16, 2017 (BE) .................................. 2017/5840

(51) Int. Cl.
*A01K 41/06* (2006.01)
(52) U.S. Cl.
CPC .................................. *A01K 41/065* (2013.01)
(58) Field of Classification Search
CPC .................................................. A01K 41/065
See application file for complete search history.

(56) References Cited

U.S. PATENT DOCUMENTS

| 578,609 | A | | 3/1897 | Morse | |
|---|---|---|---|---|---|
| 1,496,650 | A | * | 6/1924 | Reinsperg | A01K 41/06 119/325 |
| 1,626,394 | A | * | 4/1927 | Coatsworth | A01K 41/065 119/323 |
| 1,796,872 | A | * | 3/1931 | Markey | A01K 41/06 119/326 |

(Continued)

FOREIGN PATENT DOCUMENTS

| GB | 132406 A | * | 12/1918 | |
|---|---|---|---|---|
| GB | 132406 A | | 5/1919 | |

(Continued)

OTHER PUBLICATIONS

WO-2011158140-A1, Giordano (Year: 2011).*
International Search Report and Written Opinion, dated Feb. 22, 2019, from corresponding PCT application No. PCT/IB2018/058990.

*Primary Examiner* — Monica L Perry
*Assistant Examiner* — Brittany A Lowery
(74) *Attorney, Agent, or Firm* — Nixon & Vanderhye

(57) ABSTRACT

Disclosed is a cradle for the incubation process of eggs in hatcheries, for the incubation of eggs in a cradleroora and optionally the hatching of the chicks, the cradle including an outer edge and an inner structure with a. number of positions to receive eggs, whereby the cradle includes a tiltable inner structure and a stackable outer edge. Also disclosed is a stacking of the, cradles, a cradleroom, incubation process, and method for the incubation of eggs.

46 Claims, 3 Drawing Sheets

(56) References Cited

U.S. PATENT DOCUMENTS

| | | | | |
|---|---|---|---|---|
| 1,808,553 | A | * | 6/1931 | Finney .................. A01K 41/065 |
| | | | | 119/323 |
| 6,196,160 | B1 | * | 3/2001 | Pas ........................ A01K 41/06 |
| | | | | 119/322 |
| 9,232,773 | B2 | | 1/2016 | Lockie |
| 10,098,330 | B2 | | 10/2018 | Lockie |
| 2017/0238510 | A1 | * | 8/2017 | Smaal .................... A01K 41/00 |

FOREIGN PATENT DOCUMENTS

| | | | |
|---|---|---|---|
| WO | 2009/092166 A1 | | 7/2009 |
| WO | 2011/158140 A1 | | 12/2011 |
| WO | WO-2011158140 A1 | * | 12/2011 ........... A01K 41/065 |

\* cited by examiner

INCUBATION PROCESS OF EGGS IN HATCHERIES

BACKGROUND OF THE INVENTION

Field of the Invention

The present invention relates to an improved incubation process of eggs in hatcheries, more specifically to an improved cradle and an automated, integrated incubation process.

Description of the Related Art

In poultry hatcheries, eggs are incubated in so-called cradlerooms. This can be eggs of all kinds of poultry such as chickens, turkeys, ducks, etc.

To make the incubation process more understandable a description is given of how an average hatchery functions. Obviously, the process is only the same in broad outlines. Said incubation periods or days are based on the incubation process of chickens. In other poultry, these periods or days are often different.

A hatchery buys fertilised eggs and usually sells 1-day old chicks. The incubation process takes approximately 21 days.

The hatchery is part of a natural chain. The producer consists of a farm with hens and roosters. These roosters fertilise the hens. If the hens then lay eggs, most of these eggs are fertilised. The eggs are transported to a hatchery and subsequently hatched there in 21 days.

The day-old chicks are transported to a fattening farm. Approximately 80 percent of the hatcheries deliver chicks for the slaughtering sector and 20 percent delivers chicks for the laying sector. A hatchery is usually only equipped for the production of broiler chickens or laying hens. The broiler chickens go to the slaughterhouse after approximately 6 weeks. The laying hens are transferred after approximately 20 weeks to farms where they lay eggs for more than a year.

The chain is usually controlled on demand. In the slaughtering sector the slaughterhouse determines when and how much poultry is slaughtered. Based on this demand a hatchery prepares a particular number of eggs at the right time.

The process within a hatchery goes as follows.

Usually the fertilised eggs are delivered to a hatchery in a lorry. These eggs are from various producers. The eggs supplied from a particular farm of a particular producer at a particular time to the hatchery are called a batch.

Roughly, the eggs are supplied in two ways.

The first way is on pulptrays. At the producer, the eggs are put in cardboard pulptrays. These trays go to the hatchery. In the hatchery, a particular type of egg-carrier is used. This is a cradle on which a number of eggs lie in a particular pattern. In the hatchery the eggs are taken out of the pulptrays and put on the cradles.

The second way is to bring the empty cradles to a producer first. The cradles are filled with recently laid eggs at the producer. The filled cradles are transported to a hatchery. Often the first way is applied at non-contracted producers or if the eggs are imported.

Sometimes eggs are first still put in a storage area. This storage is used as a buffer between offer and demand. Fertilised eggs can possibly still be stored for approximately 2 to 3 weeks in a cool storage area before the eggs are put in the cradleroom and the real incubation begins. The longer the eggs are stored, the lesser the quality of the eggs. The fertilised eggs are sometimes also traded between hatcheries.

Usually the eggs that enter a hatchery are first disinfected to minimise the risk that viruses, bacteria and fungi enter a hatchery in this way.

When the incubation process has to start, the cradles are slid into trolleys. These are trolleys with a certain tilting device. Indeed, during the first 14 to 18 days the eggs need to be able to be tilted approximately 45 degrees alternately to the right and left. A filled trolley contains approximately 5000 eggs, depending on the type of tray and trolley. A trolley is designed to fit as many eggs as possible.

A number of trolleys is then wheeled into a cradleroom. The climate is regulated in this cradleroom to ensure optimal growth of the embryos. The parameters that are controlled are temperature, atmospheric humidity and the $CO_2$ content. It is particularly important that the temperature in the cradleroom is as uniform as possible. The number of eggs in a cradleroom varies between 30,000 and 120,000 eggs approximately, depending on the brand and type of cradleroom and type of hatchery.

After approximately 18 days the trolleys are taken out of the cradlerooms. This is necessary because there is no room in the cradles for the chicks to hatch. The cradles are taken out of the trolleys. The eggs are checked for fertilisation and/or viability in a so-called candling machine.

The rejected eggs are removed from the process and discarded. The approved eggs are laid in hatching crates. The eggs are laid in these crates loosely. The chicks have the space to hatch in these hatching crates. These hatching crates are stacked and put on so-called dollies. A number of these dollies are wheeled into a hatcher. The climate is also regulated in the hatcher such that the embryos can grow and hatch as well as possible. After 3 days the dollies are taken out of the hatcher. The total incubation process has then consisted of 18 plus 3 days.

The chicks are then separated from the shell parts and the unhatched eggs in a so-called separator or the chicks are taken out of the hatching crates by hand. The chicks are then counted and are put in chick boxes in a fixed number. The chicks can also still be vaccinated and possibly the roosters and the hens are separated.

The chick boxes are then put on transport dollies. These transport dollies with the chicks are transported by lorry to a fattening farm where they are fattened.

The current hatchery consists of a number of departments or rooms. The first is the egg room, this is the space where the eggs arrive, are disinfected and laid on cradles. The second room is the space where the cradlerooms are, the third the candling room, the fourth the room with the hatching machines, the fifth the room where the chicks are separated from the shell parts and the unhatched eggs and where the chicks are vaccinated, counted and divided into chick boxes. In this room sorting also sometimes takes place in terms of roosters and hens, the so-called sexing. There is also a dispatch room. Further, there are rooms where the waste treatment takes place and there are rooms where cradles, crates, trolleys and dollies are cleaned. Every hatchery approximately has this structure, although there are different embodiments of course.

In modern hatcheries, many of the processes are automated. However, despite automation of the processes, many actions still require personnel. This chiefly concerns the many movements with trolleys and dollies. To get a good idea: an average hatchery in Europe incubates 50 million chicks a year. Approximately 60 million eggs are provided for this. If there are 5,000 eggs or chicks on a trolley on average, 12,000 movements per room a year are made, just to transport the eggs or chicks through the hatchery. Of course a lot more transport takes place in the hatchery, such as for example the returning of empty trolleys, the cleaning of trolleys in a separate room, the cleaning of cradles and hatching crates. The cleaning of the cradlerooms and hatchers is also a labour-intensive, monotonous and manual job.

In current hatcheries an increase in scale is very important. Through increase in scale and a higher capacity (number of eggs/chicks to be processed an hour) it is possible to keep making a profit.

However, we are reaching the limits. Finding personnel is becoming an ever greater problem. The work is often monotonous and physically heavy. A certain level of technical insight is important to operate the often advanced machines. The combination of these two things means finding suitable personnel is difficult and particularly retention of suitable personnel is becoming increasingly difficult. Due to strict working hour laws it is almost impossible to let personnel work longer days. Working in shifts is expensive and finding personnel who want to work in a shift system is almost impossible. Furthermore, various processes in current hatcheries are chick unfriendly, such as the separator and the chick counter. The traceability of individual eggs and chicks is also not possible.

SUMMARY OF THE INVENTION

The purpose of the present invention is to provide a solution to at least one of the aforementioned and other disadvantages.

To this end, the invention relates to a cradle for the incubation process of eggs in hatcheries, for the incubation of eggs in a cradleroom and optionally the hatching of the chicks in a cradle room or in a hatching room, the cradle comprising a number of positions for receiving eggs, whereby the cradle comprises at least two sidewalls and an inner structure for receiving eggs, whereby the inner structure can be tilted in relation to at least two sidewalls.

The cradle comprises an outer edge and an inner structure with a number of positions to receive eggs, whereby the cradle comprises a tiltable inner structure and a stackable outer edge.

In a preferred embodiment of a cradle according to the invention the inner structure is tiltable in relation to at least two sidewalls of the outer edge.

In another preferred embodiment of a cradle according to the invention the outer edge of the cradle remains in a fixed position and is not tilted.

In yet another preferred embodiment of a cradle according to the invention the outer edges can be stably stacked.

In a preferred embodiment of a cradle according to the invention the outer edge of the cradle is a stacking edge.

In another preferred embodiment of a cradle according to the invention the cradles are automatically stackable.

In yet another preferred embodiment of a cradle according to the invention the cradles are automatically tiltable.

In a preferred embodiment of a cradle according to the invention several of said cradles are horizontally stackable on each other. The cradles are positioned horizontally with their outer edge.

In a preferred embodiment of a cradle according to the invention the at least two sidewalls of the cradle are made such that they provide at least partially provide support for the stacking of several cradles on each other via said sidewalls.

In a specific embodiment of a cradle according to the invention the cradle comprises four sidewalls which are stackable on the sidewalls of another cradle. More preferably the cradle comprises four sidewalls which are stackable on the sidewalls of an identical cradle.

In a specific embodiment of a cradle according to the invention the contour of the cradle has the shape of a rectangle with two long and two short sides, whereby the tilting is preferably provided between the longest sidewalls. Preferably the tilting point is located in the middle of the sidewalls.

In a specific embodiment of a cradle according to the invention, the cradles are automatically stackable and tiltable.

In another specific embodiment of a cradle according to the invention the cradle is tiltable in two directions.

Preferably this occurs alternately in the one and in the other direction such that the eggs change direction during the incubation.

In another embodiment of a cradle according to the invention the cradle is suitable for setting eggs and hatching chicks.

In an alternative embodiment of a cradle according to the invention the cradle comprises space per egg position for the hatching of chicks, preferably a separate space per egg position.

During the entire incubation process, the eggs can remain in one and the same cradle or be transferred to other cradles in the interim.

In a preferred embodiment of a cradle according to the invention the cradle is provided with a unique ID for the automatic storage (in a computer system) of individual data of eggs and/or chicks, or data of the cradle in its entirety.

The invention also relates to a stacking of two or several cradles as described above, whereby the sidewalls of the one cradle are stacked on the sidewalls of the other cradle, and the respective inner structures of the cradles are jointly or individually tiltable.

More specifically two or more cradles are stacked on each other via the outer edge.

In a preferred embodiment of a stacking or a stack of cradles according to the invention the respective inner structures of the cradles are jointly or individually tiltable in the same direction.

In another preferred embodiment of a stacking according to the invention the inner structure of a cradle is tiltable via a system that simultaneously tilts the individual inner structures of every cradle or the inner structures of a whole stack of cradles.

In yet another preferred embodiment of a stacking according to the invention the cradles are automatically stacked.

In a further preferred embodiment of a stacking according to the invention the cradles are automatically tilted.

In a third aspect the invention relates to an incubation process for the incubation of eggs in a cradleroom comprising a first part of the incubation process and a first cradle as described above for the incubation of eggs, whereby the eggs in a second part of the incubation process are transferred to a second cradle for the hatching of the chicks.

In a preferred embodiment of an incubation process according to the invention the incubation process takes place in a cradleroom comprising cradles and/or stackings of cradles as described above, whereby the stacking/unstacking of the cradles and the tilting of the inner structures is fully automated.

In another preferred embodiment of an incubation process according to the invention the incubation process comprises a first part and a first cradle as described above, whereby in a second part of the incubation process the eggs are transferred to a second cradle for the hatching of the chicks.

In yet another preferred embodiment of an incubation process according to the invention the second cradle is automatically stackable and not tiltable.

In another preferred embodiment of an incubation process according to the invention the first or second cradle is optionally placed in a hatching room.

In a specific embodiment of an incubation process according to the invention the second cradle is optionally provided with an inner structure with separate areas for the chicks.

In a preferred embodiment of an incubation process according to the invention the second cradle is also stackable.

The second cradle can optionally be placed in a hatching room.

In a certain embodiment of an incubation process according to the invention the first part of the incubation process takes approximately 18 days and the second part of the incubation process approximately 3 days.

In a preferred embodiment of an incubation process according to the invention other subprocesses are also automated, such as identification of eggs, the quality control of eggs and chicks, disinfection of eggs, transferring, candling, sexing, vaccinating, counting of chicks, dosing feed and water in chick boxes.

Preferably, data are stored per egg position such as origin, destination, variety, sex, etc.

In a special preferred embodiment of an incubation process according to the invention, preferably a centralised computer system automates the entire incubation process or parts thereof.

In a specific embodiment of an incubation process according to the invention the incubation of the eggs and the hatching of the chicks is in the same cradleroom. Optionally this can also be in separate rooms.

In another preferred embodiment of an incubation process according to the invention the incubation of the eggs takes place in a cradle room and the hatching of the chicks takes place in a hatching room.

In a preferred embodiment of an incubation process according to the invention the second cradle is provided with an inner structure with separate areas or cubicles for the chicks.

In a fourth aspect the invention relates to a cradleroom for the incubation process of eggs in hatcheries, comprising the incubation of eggs and optionally the hatching of the chicks, whereby the eggs are located in one or more cradles as described above or located in a stacking as described above, whereby the stacking/unstacking of the cradles and the tilting of the inner structures is fully automated.

In a preferred embodiment of a cradleroom according to the invention the loading and unloading of the cradles in and out of the cradlerooms is automated.

Preferably each cradleroom has its own stacker and destacker.

In a preferred embodiment of a cradleroom according to the invention it is automatically cleaned.

In a certain embodiment of a cradleroom according to the invention the room is suitable for both the first and the second part of the incubation process.

The invention also relates to a method for the incubation of eggs in a cradleroom and optionally the hatching of the chicks, whereby the eggs are located in a cradle or in a stacking of cradles as described above, the method comprising the following steps: a) automatic loading of a (first or second) cradle in the cradleroom, b) optimal automatic stacking of the cradles on top of each other and allow to incubate, c) automatic destacking and unloading from the cradleroom either at the end of the incubation process, or at a random moment in between, and d) if necessary repeat steps.

After step b the inner structures of the cradles are automatically tilted when needed.

In another embodiment of a method according to the invention, it comprises the following steps: a) automatic destacking of the cradles at a random moment during the incubation process, b) automatic transport of the cradles to a handling station where the eggs and/or chicks are inspected, treated or removed, c) automatic return transport to the cradleroom, and d) automatic restacking of the cradles in the cradleroom, possibly in the same position as before.

In a special embodiment of a method and an incubation process according to the invention, early harvesting is possible. The chicks are hereby taken out of the cradlerooms and cradles in several steps according to the following steps: a) remove a (second) cradle from a cradleroom at a particular moment; b) take the chicks that have already hatched at that time out of the cradle and put them in a chick box, whereby the eggs that have not yet hatched, remain in the cradle; c) return the cradle to the cradleroom; and d) repeat steps a to c every few hours until (almost) all chicks have hatched.

In a very preferred embodiment of a method according to the invention the method involves a fully automatic process.

BRIEF DESCRIPTION OF THE DRAWINGS

With the intention of better showing the characteristics of the invention, a preferred embodiment of a device according to the invention is described hereinafter, by way of an example without any limiting nature, with reference to the accompanying drawings wherein:

FIGS. 1 A and B schematically shows a preferred embodiment of a cradle according to the invention whereby

FIG. 1B shows a cradle 1 with a tilted inner structure 3, in FIG. 1A the inner structure 3 is parallel to the outer edge, i.e. not set up in a tilted way. The inner structure includes cams 7 which each comprise an upward projection 7a and a curved bottom 7b with two end projections 7c. A unique ID 8 is provided for the automatic storage (in a computer system) of individual data of eggs and/or chicks, or data of the cradle in its entirety.

FIGS. 2 A and B shows two cradles 5 according to FIG. 1 which are stacked on each other via the outer edge 2. The inner structure 3 of both cradles is tilted via the tilting points 4 and takes up minimum space. By tilting (the inner structure 3 of) one cradle the stacked cradles automatically tilt along in the same direction.

The tilting can be done both in a left and right direction, preferably over a maximum of 45 degrees.

Figure 1A:
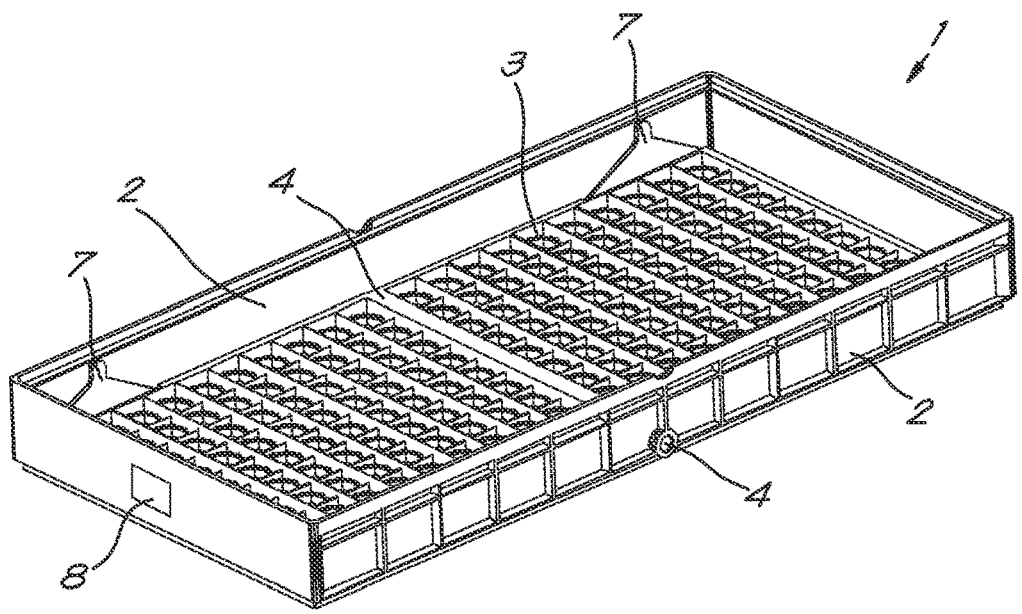
FIGS. 1A and B shows a cradle 1 according to the invention. The cradle 1 has an outer edge 2 and a tiltable inner structure 3. A number of positions are included in this inner structure 3 in which eggs can be placed. The inner structure 3 is tiltable in relation to the outer edge 2 via tilting points 4.
Figure 1B:
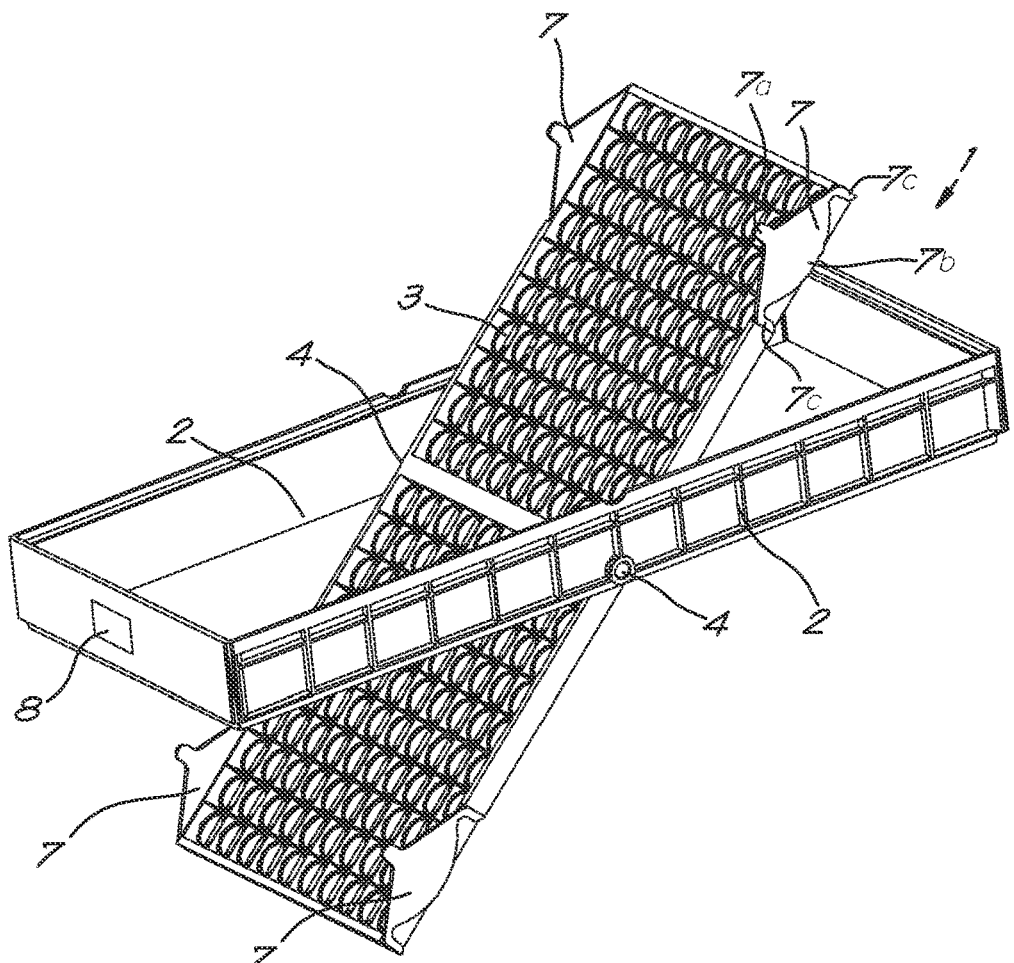
FIG. 1B shows a tilted cradle.
Figure 2A:
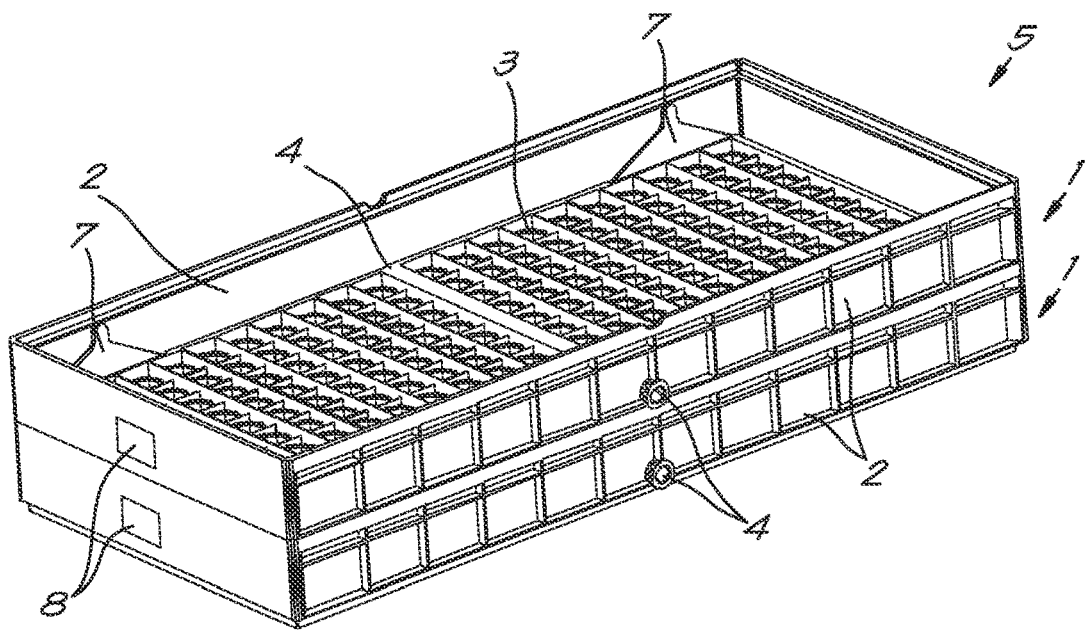
FIG. 2 shows a stacking of two cradles according to FIG. 1, whereby the cradles in FIG. 2B are tilted.
Figure 2B:
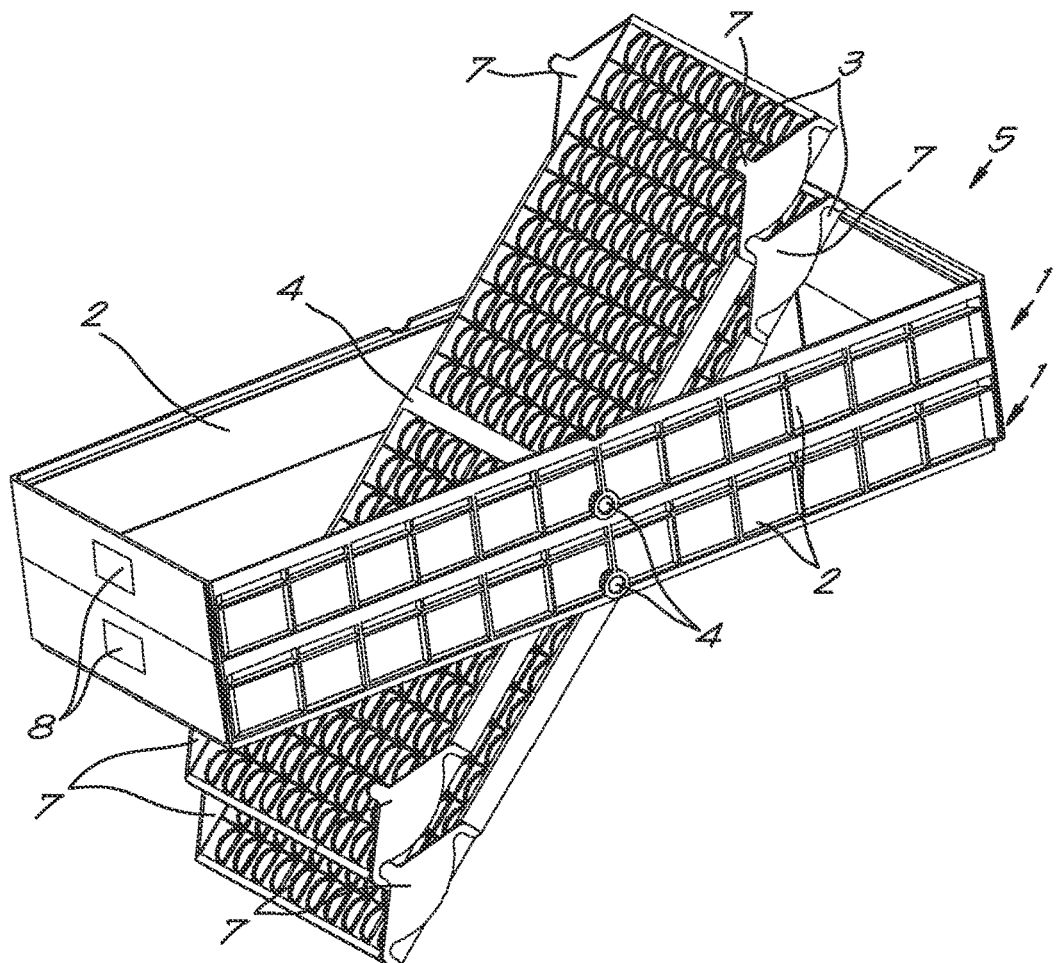
Figure 3:
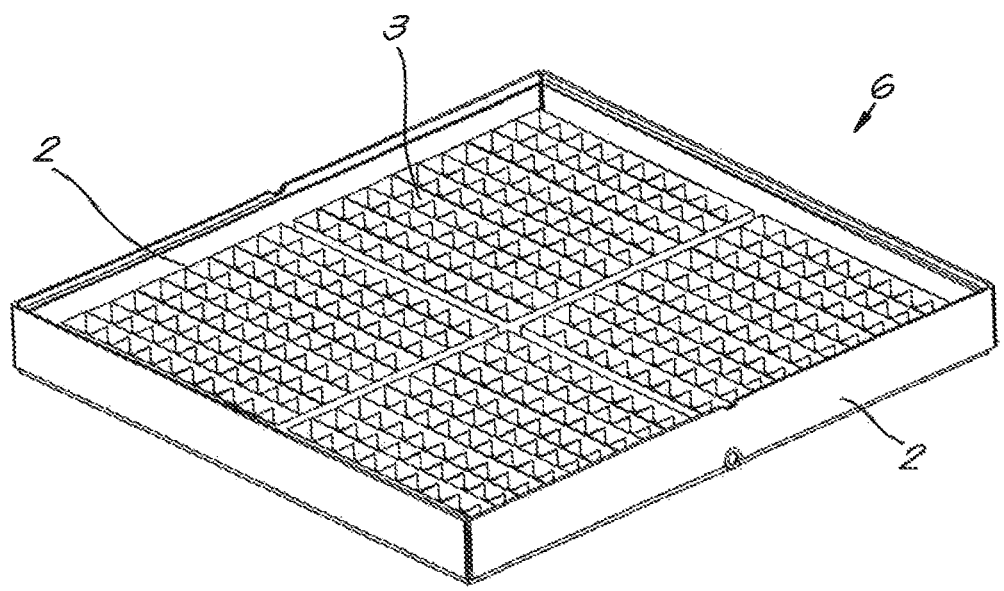
FIG. 3 shows a second type of cradle.

FIG. 3 shows a second type of cradle (6) that is not tiltable. The eggs hatch in separate areas or cubicles. In this way, when the eggs have hatched, the roosters and hens can be separated from each other for example. When all the chicks hatch in a box together, the individual chicks can no longer be treated and followed.

DESCRIPTION OF THE INVENTION

The cradle (hereinafter referred to as cradle 1) has a stackable outer edge and a tiltable inner structure. This cradle 1 includes a number of positions in which eggs can be placed. These eggs are then, as is customary, placed in these positions vertically or almost vertically with the widest top pointing upward.

Cradle 1 is stackable via the outer edge of cradle 1. The outer edge is provided with a stacking edge. This can be executed in different ways.

The inner structure of cradle 1 is tiltable via a system that simultaneously tilts the individual inner structures of every cradle or the inner structures of a whole stack of cradles. This can be done for example by having a cylinder push at the bottom against an inner structure such that all inner structures of the whole stack move along at the same time. To this end the inner structure is provided with a cam 7 which transfers the movement to the next cradle of the stack. This system could also be placed at the top, such that an inner structure can be pushed down. Consequently, all inner structures of a stack are tilted. Tilting is also possible in an alternative way.

The contour of the cradle usually has the shape of a rectangle with two long and two short sides. Preferably, the tilting is via a cam provided between the longest sides (sidewalls). Preferably, the tilting point is located in the middle of the longest side (sidewall). Tilting can also be done via a cam provided between the shortest sides (sidewalls).

The inner structure largely looks like a commonly used cradle available on the market. The egg density is comparable with that of a commonly used cradle.

The combination of a tiltable inner structure with a stackable outer edge makes the application of internal transport trolleys unnecessary.

The cradle 1 is designed such that good climate control is possible for the eggs. In practice this means that along the eggs a certain air flow can be created such that the climate in the cradleroom can be kept as uniform as possible.

If a cradleroom needs to be filled, a certain number of cradles 1 is stacked inside or outside the cradleroom by means of a stacker and the stack is subsequently transported by means of a transporter or another transport medium to the desired location in the cradleroom. A destacker can then singulate the cradles again if the cradles need to be taken out of the cradleroom. Preferably, this is on the other side of the cradleroom, to achieve the first-in first-out principle. Of course, several embodiments can be conceived of order and location of stacking, destacking and storage of the cradles 1. These embodiments also fall under this patent. Because it is no longer necessary to use trolleys and dollies in the hatchery, this results in considerable cost cuts in terms of equipment, cleaning and labour.

To ensure traceability, it is possible to keep data per position. Every egg or chick position has a unique identification number. A coordinating computer system can then keep the data for each position such as incubation time, name of producer, farm number of producer, sex, variety, temperature, etc. However, traceability is not necessary in this new invention. In current hatcheries this is not generally applied either, although traceability attempts have been made in the market.

It is known that during the incubation period, the eggs need to be able to be tilted. In this cradleroom it is also possible to tilt the cradles, but this can also be switched off. To enable the tilting every cradle consists of an outer edge and a tiltable inner structure. The inner structure is tiltable in relation to at least two sidewalls of the outer edge.

Because the inner structure tilts, the outer edges can be stably stacked and remain in a fixed position. In other words, the outer edges of the cradles are not tilted as is the case in current hatcheries where the entire cradle is tilted.

A mechanism in the cradleroom ensures that all inner structures of a stack can be tilted if desired. Indeed, after approximately 14 to 18 days it is no longer necessary to tilt the eggs.

Just as in a traditional hatchery the climate in the cradleroom is kept as optimal as possible for the growth and development of the embryo to chick. The climate is regulated separately per cradleroom depending on the stage of the incubation process.

The filling of the cradleroom is automated. When the eggs have arrived on pulptrays, the eggs in the egg room or in the storage area are automatically transferred from the pulptrays (or another type of transport-egg carrier) to cradle 1. This cradle 1 is taken to the correct cradleroom by means of a transport medium or, if desired, first automatically stored in a storage room. If a cradleroom needs to be filled this can also be done with previously filled cradles that were already in the storage room and were taken out.

Of course it is also possible that the eggs are stored in pulptrays or in another type of transport-egg carrier in the storage room. In this method the eggs are only transferred to the cradles when the cradleroom needs to be filled.

In existing hatcheries the cradlerooms' doors border the corridors such that the cradlerooms can be reached via the corridors to fill or empty the cradlerooms, for example. The trolleys and dollies with a stack have a restricted height (usually lower than 2 metres) because higher dollies and trolleys cannot be justified due to the instability and high mass of the dollies and trolleys. Because the higher the objects transported through the hatchery, the higher the risk of accidents. Furthermore, it is not practical if employees need tools such as a step or stairs to handle the top cradles or hatching crates.

However, in the present invention this restriction is not applicable. Indeed, manual stacking and driving trolleys and dollies are no longer necessary.

In the most practical embodiment, every cradleroom has its own stacker and destacker. It is also possible that the stacker and destacker can be moved to the cradleroom where a stacking action or a destacking action is necessary.

With the present invention it is therefore possible to create stacks that can be much higher than on the current trolleys or dollies. This has several advantages. To guarantee the stability of a high stack the cradle can have a greater surface area than most current cradles or hatching crates. The walls of a cradleroom can also be used as fall protection. The weight of the cradles is no longer bound to working condition regulations because manual lifting and moving by employees is no longer necessary. Because the stacking height is much higher, a lot of eggs can be hatched on a relatively small floor area of the building.

In existing hatcheries a cradleroom is emptied around day of the incubation process and the viable eggs are transferred to hatching crates. The reason this is done around day 18 is that the eggs have to remain in the cradleroom for as long as possible because the eggs need much less space there than in the chick box and also because the eggs have to be tilted.

However, if this takes too long the chicks already hatch. Hatching in the cradleroom is not desirable because cradles are unsuitable to hatch the chicks. If the chicks already hatch in the cradleroom, it is no longer possible to transfer the eggs in an automated way.

However, for some actions of the egg it is much better that a cradleroom is emptied before day 18 of the incubation process. An example of this is determining whether the egg contains a rooster or a hen. In an egg laying hatchery for instance, it is important to know this as early as possible. In a hatchery that wants to produce laying hens, the roosters are unwanted, because they don't lay eggs. The current practice in an egg laying hatchery is that after the chick has hatched, it is determined whether the chick is a rooster or a hen. The roosters are separated from the hens and the roosters are killed. Let it be clear this is a very unwanted practice, both socially and financially.

With the present invention it is easily possible to take the eggs out of the cradleroom on a random day in the incubation process and to check, treat or remove them. For this, the stacks of cradles 1 are destacked, the cradles 1 are transported to a machine or machine line by means of automatic transport, the eggs are inspected, treated or removed by this machine or machine line and subsequently the cradles 1 are transported back to a cradleroom and stacked again. Preferably, this is a fully automatic process and no human actions are necessary anymore.

It is not necessary that the cradles are put back in the same position in the cradleroom, but it is desirable to put them back in the same cradleroom to keep the overview.

Because (almost) no personnel is necessary, the most ideal time can be determined to perform these types of processes. This can also be at night for example.

Because measurement techniques to determine the sex will get better and better, such that the sex can be determined earlier in the incubation process, the measurement time can also be chosen very flexibly. The status of every egg is stored by the computer system which automates the entire incubation process or parts thereof.

The computer system can be a central computer system, or can consist of linked decentralised computer systems. Other processes that the computer system can automate are described below.

In the other parts of the hatchery a far advanced level of automation can also take place. For example, it is possible to automatically wash, disinfect, dry the cradles, store them in a warehouse (or cradleroom) and return them to the room where the eggs are put in the cradles.

It is also possible to automate all other processes in the hatchery. Examples of this include: automatic quality control of eggs and chicks, disinfection of eggs, candling, transferring, sexing, vaccinating, counting chicks and dosing feed and water in chick boxes.

For the slaughtering sector it is also interesting to separate the roosters and the hens. Both roosters and hens are fattened, but there is increasingly more need for fattening farms where the roosters and the hens are fattened separately. Consequently, the fattening process can be optimised for both roosters and hens, for example the composition and quantity of the feed and the ideal moment of slaughter.

It is also possible to fix the positions of the hens and the roosters in the computer system. The roosters and hens can then be separated before or after hatching.

With this invention it is also possible to give the roosters and the hens a separate treatment, for example the type of vaccination can be different for roosters and hens. It is also possible to add nutrients in the egg. The treatments can take place in the egg or in the chick.

Because data can be collected per egg position, it is possible to use these data to optimise the incubation process or for example for maintenance purposes or to make forecasts relating to the fatteners or to provide information to the producers.

After approximately 18 days, in the current practice, the eggs are taken out of the cradlerooms to be inspected. The viable eggs can stay. The unfertilised eggs and the eggs that do not show any signs of life anymore can be taken out of the process, but this is not necessary.

In current hatcheries the eggs are put in hatchers after 18 days. These hatchers are emptied again 3 days later. The chicks, which have hatched in these 3 days are separated from the shell parts. This means that a chick that hatched early spends approximately 2 days in a hatching crate without feed and drink. Currently there are hatcheries that offer feed and drink to the chicks in the cradlerooms, but there are also considerable drawbacks, particularly in terms of hygiene.

With the present invention the eggs can be transferred to another cradle. This is called cradle 2. This cradle 2 can be stacked in the same way as cradle 1. However, in cradle 2 a tiltable inner structure is not desired because it is not necessary to tilt the eggs in the last part of the incubation process. In cradle 2 the chicks can also be kept individually, but this is not necessary.

The cradlerooms for the last (3) days of the incubation process can be special hatching cradlerooms, but this is also not necessary. In a practical embodiment all cradlerooms are suitable for both the first and the second part of the incubation process.

With the present invention it is possible to take the chicks out of the cradles in several steps. This is called "early harvesting". The cradles 2 are hereby taken out of a cradleroom at the start of the $20^{th}$ day for example. The chicks that have already hatched at that time are taken out of the cradle and put in a chick box. Feed and water can be available in this chick box, but it is not necessary. The hatchery can also decide to already transport these chicks directly to a farm, such that the chicks can already be fattened earlier compared to in current hatcheries.

The eggs that have not yet hatched, remain standing or lying in cradle 2. The cradle 2 is put back in a cradleroom. In this way it is possible to check again for hatched chicks a couple of hours later. During a last round the remaining shell parts and any unhatched eggs are destroyed or these eggs are collected to give them more time to hatch at a separate location.

This method prevents that a chick has to stay in the cradleroom for too long without feed and drink. Also, for example the $CO_2$ content in cradlerooms is considerably high normally. By taking chicks out of the cradleroom and cradle early, extra stress caused by the high $CO_2$ content is prevented.

If a hatchery decides to keep the chicks up to day 21, until all chicks of a certain batch have hatched, this is possible in another room with heating and ventilation. However, this room does not have to be as conditioned as the cradlerooms.

Some hatcheries also deliver eggs to the fattening farm, instead of chicks. These eggs have then been incubated approximately 18 days. The last days of the incubation process do not take place at the hatchery but at the fattening farm. The chicks hatch at the farm in this case. With the present invention this form of the incubation process is also easy to carry out. A choice can then be made to transport the cradle 1 to a fattening farm or to transfer the eggs from the cradle 1 to another transport medium.

In the most practical embodiment the non-viable eggs are taken out of the cradle 1 and the cradle 1 (or another transport medium) is restocked with viable eggs. This is done to keep the transport costs as low as possible.

A major advantage of keeping the eggs and the chicks individually is that the contamination risk in relation to each other is minimised.

The structure of a hatchery according to the invention therefore has a major advantage in the field of personnel. Because the processes are automated as much as possible, much less personnel is needed and one is far less dependent on personnel that is difficult to obtain. The personnel that is still needed is given more of a controlling and/or technical background. In theory the processes could take place 24/7, but of course there still needs to be time for maintenance and cleaning as well.

An added advantage is that the processes can be distributed over more working hours a day than in current hatcheries. This is because the processes are no longer dependent on the availability of production personnel. On the one hand this means a simple increase in scale is possible and on the other hand that the processes can be done more calmly and efficiently.

In current hatcheries the cleaning of the cradlerooms and hatchers and corridors takes up a lot of time. Furthermore, because the chicks can be taken out of the cradleroom at an early stage, a large part of the waste production can be prevented. The chicks' faeces and down produce most of the waste.

In the present invention the cradlerooms can be provided with an automatic cleaning system, also called "Clean In Place" (CIP), such that a lot can be saved on working hours and biosecurity can be raised to a higher level because one is no longer dependent on the availability of personnel.

Clean In Place systems can also be used to clean machines, which means a lot can be saved on personnel here too.

Moreover, no trolleys and dollies as transport medium in the hatchery are needed. This means considerable cost cuts, not only in terms of purchase but also in terms of maintenance and cleaning.

The new invention also frees up space around machines and machine lines because it is not necessary to drive around the machines with trolleys and dollies. The automatic cleaning also saves space because it is no longer necessary to be able to walk all around the machines.

The waste treatment too can be almost fully automated. In current hatcheries this already happens partially but the automatic cleaning and disinfecting of waste collection systems are often missing.

The present invention is by no means limited to the embodiments described as an example and shown in the drawings, but a device according to the invention as defined by the claims can be realised in all kinds of variants without departing from the scope of the invention.

The invention claimed is:

1. A cradle (1) for incubation of eggs in a cradleroom in a hatchery, the cradle comprising:
   an outer edge (2), with at least two sidewalls; and
   a bottom configured as an inner structure (3), with a number of positions to receive eggs,
   wherein the outer edge (2) is stackable and configured for stably stacking with an other cradle (1),
   wherein the inner structure (3) is tiltable in relation to the two sidewalls (2) of the outer edge, and
   wherein the inner structure (3) is configured to transfer a tilting movement to an inner structure of the other cradle.

2. The cradle (1) according to claim 1, wherein the outer edge (2) of the cradle is configured to remain in position and is not tilted while the inner structure tilts.

3. The cradle (1) according to claim 1, wherein the outer edges (2) are configured to stably stack with outer edges of the other cradle.

4. The cradle (1) according to claim 1, wherein the cradle (1) is automatically stackable.

5. The cradle (1) according to claim 1, wherein the cradle (1) is automatically tiltable.

6. The cradle (1) according to claim 1, wherein the cradle (1) comprises four sidewalls (2) which are stackable with the sidewalls of the other cradle (1).

7. The cradle (1) according to claim 1, wherein a contour of the cradle is shaped as a rectangle with two long sides and two short sides.

8. The cradle (1) according to claim 6, wherein a tilting point (4) of the inner structure is located at a middle of the sidewalls (2).

9. The cradle (1) according to claim 1, wherein the inner structure (3) of the cradle (1) is tiltable in two directions.

10. The cradle (1) according to claim 1, wherein the cradle (1) is configured for setting eggs and hatching chicks.

11. The cradle (1) according to claim 1, wherein the cradle (1) is provided with a unique ID (8) for automatic storage of individual data of eggs and/or chicks, or data of the cradle in its entirety.

12. A stacking (5) for incubation of eggs in a cradleroom in a hatchery, comprising:
   two or more cradles (1) that stack with one another, each one of said two or more cradles comprised of
      an outer edge (2) with at least two sidewalls, and
      a bottom configured as an inner structure (3) and including plural positions to receive eggs,
      the inner structure (3) being tiltable in relation to the two sidewalls of the outer edge,
   wherein a first cradle of the two or more cradles stacks with a second cradle of the two or more cradles via the outer edges of the first and second cradles, and
   wherein a tilting of the inner structure (3) of the first cradle stacked with the second cradle causes an automatic tilting of the second cradle in a same tilting direction.

13. The stacking (5) according to claim 12, wherein respective inner structures (3) of the two or more cradles (1) are jointly or individually tiltable in a same direction.

14. The stacking (5) according to claim 12, wherein the inner structure of a cradle (1) of said two or more cradles (1) is tiltable via a system that simultaneously tilts individual inner structures (3) of every cradle of the two or more cradles by way of a cylinder that pushes at a bottom against the inner structure (3) of the first cradle such that all the inner structures (3) of the stack of said two or more cradles move along at a same time.

15. The stacking (5) according to claim 12, wherein the two or more cradles (1) are automatically stacked.

16. The stacking (5) according to claim 12, wherein the two or more cradles (1) are automatically tilted.

17. An incubation process for incubation of eggs in a cradleroom comprising stackings (5) according to claim 12, wherein the stacking/unstacking of the cradles (1) and the tilting of the inner structures (3) is fully automated.

18. The incubation process according to claim 17, comprising a first part of the incubation process for the incubation of eggs using a first cradle (1) of said two or more cradles, and a second part of the incubation process wherein the eggs are transferred to a second cradle (6) of said two or more cradles for hatching of chicks from the eggs.

19. The incubation process according to claim 17, wherein the second cradle (6) is automatically stackable and not tiltable.

20. The incubation process according to claim 17, wherein the first (1) or second cradle (6) is placed in a hatching room.

21. The incubation process according to claim 18, wherein the second cradle (6) is provided with an inner structure (3) with separate areas for the chicks.

22. The incubation process according to claim 18, wherein the first part of the incubation process takes approximately 18 days and the second part of the incubation process approximately 3 days.

23. The incubation process according to claim 17, wherein other subprocesses are also automated, including identification of eggs, quality control of eggs and chicks, disinfection of eggs, transfer, candling, sexing, vaccinating, counting of chicks, and dosing of feed and water in chick boxes.

24. The incubation process according to claim 17, wherein per egg position, data is stored such as origin, destination, variety, and sex.

25. The incubation process according to claim 17, wherein a computer system automates the whole incubation process or parts thereof.

26. The incubation process according to claim 17, wherein the incubation of the eggs and the hatching of the chicks happens in the same cradleroom.

27. The incubation process according to claim 17, wherein the incubation of the eggs takes place in a cradleroom and the hatching of the chicks takes place in a hatching room.

28. A cradleroom for incubation process of eggs in hatcheries, wherein the eggs are located in one or more cradles (1, 6) according to claim 1, whereby the stacking/unstacking of the cradles (1) and the tilting of the inner structures (3) is fully automated.

29. The cradleroom according to claim 28, wherein the loading and unloading of cradles (1, 6) is automated.

30. The cradleroom according to claim 28, wherein every cradleroom comprises its own stacker and destacker.

31. The cradleroom according to claim 28, wherein the cradleroom is automatically cleaned.

32. The cradleroom according to claim 28, wherein the room is configured for both a first and the second part of an incubation process.

33. A method for incubation of eggs in a cradleroom, whereby the eggs are located in a cradle (1, 6) according to claim 1, comprising the following steps:
  a. automatic loading of a (first or second) cradle (1, 6) in the cradleroom or hatching room;
  b. automatic stacking of the cradles (1, 6) on each other and incubation;
  c. automatic destacking and unloading out of the cradleroom or hatching room either at the end of the incubation process, or at a random moment in between; and
  d. repeat steps if necessary.

34. The method according to claim 33, whereby after step b the inner structures (3) of the cradles (1) are automatically tilted.

35. The method according to claim 33, comprising the following steps:
  a. automatic destacking of the cradles (1, 6) at a random moment during the incubation process;
  b. automatic transport of the cradles (1, 6) to a treatment station where the eggs and/or chicks are inspected, treated or removed;
  c. automatic return transport to the cradleroom or hatching room; and
  d. automatic restacking of the cradles (1, 6) in the cradleroom or hatching room, possibly in the same position as before.

36. The method according to claim 33, whereby in several steps the chicks are taken out of the cradles (1, 6) according to the following steps:
  a. taking the cradle (1, 6) out of a cradleroom or hatching room at a certain moment;
  b. taking the chicks that have already hatched at that time out of the cradle (1, 6) and putting them in a chick box, whereby the eggs that have not yet hatched, stay;
  c. returning the cradle (1, 6) to the cradleroom or hatching room; and
  d. repeating steps a to c every few hours.

37. The method according to claim 33, whereby this is a fully automatic process.

38. The cradle (1) according to claim 1, wherein the inner structure is provided with a cam (7) which transfers the tilting movement to the inner structure of the other stacked cradle.

39. The cradle (1) according to claim 1,
  wherein the inner structure is fitted with four cams (7),
  wherein each cam (7) comprises an upward projection (7a) and a curved bottom (7b) with two end projections (7c),
  wherein the cams are shaped so that the upward projection (7a) of the cradle projects against a center of a curved bottom of the other cradle in an untilted position, and said curved bottom of the other cradle is shaped to guide said upward projection (7a) during the tilting movement, and
  wherein the end projections of the other first cradle are shaped to receive said upward projection (7a) in a stable tilted position.

40. The cradle (1) according to claim 1, wherein the inner structure is tiltable over a maximum of 45 degrees both in a left and a right direction.

41. The stacking (5) according to claim 12, wherein the inner structure of a cradle (1) of said two or more cradles (1) is tiltable via a system that simultaneously tilts individual inner structures (3) of every cradle of the two or more cradles by way of a cylinder that pushes down against a top of the inner structure (3) of the second cradle such that all the inner structures (3) of the stack of said two or more cradles move at a same time.

42. The stacking (5) according to claim 39, wherein, in a stable tilted position of the inner structure in either of a first or a second direction, the upward projection (7a) of the cam of a cradle is received at one of the end projections (7c) of the cam (7) of the other cradle stacked above.

43. The stacking (5) according to claim 39, wherein, during tilting of the inner structures in either of a first or a second tilting direction, the upward projection (7a) projects along the curved bottom (7b) of the other cradle stacked above.

44. The stacking (5) according to claim 12, wherein the inner structures of the two or more cradles are tiltable over a maximum of 45 degrees both in a left and a right direction.

45. The stacking (5) according to claim 12,
wherein the inner structure of each one of said first and second cradles is fitted with four cams (7), each cam (7) including an upward projection (7*a*) and a curved bottom (7*b*) with two end projections (7*c*),
wherein the cams are shaped so that the upward projection of the first cradle, in a configuration where the second cradle is stacked atop the first cradle in an untilted position, projects against a center of the curved bottom of the second cradle, and the curved bottom of the second cradle is shaped to guide the upward projection of the first cradle during the tilting, and
wherein the end projections of the second cradle are shaped to receive the upward projection of the first cradle in a stable tilted position.

46. The stacking (5) according to claim 12,
wherein the inner structure of each one of said first and second cradles is fitted with four cams (7), each cam (7) including an upward projection (7*a*) and a curved bottom (7*b*) with two end projections (7*c*),
wherein the cams are shaped so that the upward projection of the second cradle, in a configuration where the first cradle is stacked atop the second cradle in an untilted position, projects against a center of the curved bottom of the first cradle, and the curved bottom of the first cradle is shaped to guide the upward projection of the second cradle during the tilting, and
wherein the end projections of the first cradle are shaped to receive the upward projection of the second cradle in a stable tilted position.

\* \* \* \* \*